United States Patent [19]
Flower

[11] Patent Number: 5,474,305
[45] Date of Patent: Dec. 12, 1995

[54] SEALING DEVICE

[75] Inventor: Ralph F. J. Flower, Devizes, England

[73] Assignee: Cross Manufacturing Company (1938) Limited, England

[21] Appl. No.: 30,250

[22] PCT Filed: Sep. 18, 1991

[86] PCT No.: PCT/GB91/01592

§ 371 Date: Mar. 17, 1993

§ 102(e) Date: Mar. 17, 1993

[87] PCT Pub. No.: WO92/05378

PCT Pub. Date: Apr. 2, 1992

[30] Foreign Application Priority Data

Sep. 18, 1990 [GB] United Kingdom .............. 9020317

[51] Int. Cl.⁶ .............................................. F16J 15/447
[52] U.S. Cl. ........................... 277/53; 277/160; 277/174
[58] Field of Search ............................. 277/53, 157, 160, 277/174

[56] References Cited

U.S. PATENT DOCUMENTS

| 4,358,120 | 11/1982 | Moore | 277/53 X |
|---|---|---|---|
| 4,989,886 | 2/1991 | Rulis | 277/53 X |
| 5,042,823 | 8/1991 | Mackay et al. | 277/53 |
| 5,066,025 | 11/1991 | Hanrahan | 277/53 |
| 5,090,710 | 2/1992 | Flower | 277/53 |
| 5,176,389 | 1/1993 | Noone et al. | 277/53 |
| 5,201,530 | 4/1993 | Kelch et al. | 277/53 |
| 5,265,412 | 11/1993 | Bagepalli et al. | 277/53 X |

FOREIGN PATENT DOCUMENTS

| 0453315 | 10/1991 | European Pat. Off. | 277/53 |
|---|---|---|---|
| 2258277 | 2/1993 | United Kingdom | 277/53 |
| 2014951 | 9/1992 | WIPO | 277/53 |
| 3003299 | 2/1993 | WIPO | 277/53 |

*Primary Examiner*—William A. Cuchlinski, Jr.
*Assistant Examiner*—John L. Beres
*Attorney, Agent, or Firm*—Andrus, Sceales, Starke & Sawall

[57] ABSTRACT

A seal assembly for effecting a seal between two machine components has a housing (15) which defines a channel in which is slidably located an elongate brush seal member (21). A wave spring (28) is located in the channel between the base thereof and the brush seal member to urge the latter outwardly. The brush seal member has a plurality of bristles (24) the free ends of which bear on the second component against which a seal is to be effected, the bristles being disposed between a pair of support plates (22 and 23). On the low-pressure side of the seal, the support plate (23) extends almost to the free tips (26) of the bristles (24) and has a rubbing surface (27) which extends to and is intended to contact the surface against which a seal is to be effected. In the case of a circular seal assembly, a ring may surround the brush seal member and wave spring, whereby the ring, spring and brush seal member are all capable of floating within the channel in the housing.

28 Claims, 5 Drawing Sheets

5,474,305

SEALING DEVICE

BACKGROUND OF THE INVENTION

1. Field of the Invention

This invention relates to a seal assembly, and in particular to a seal assembly suitable for effecting a seal between two machine components.

2. Description of the Related Art

It is frequently necessary to effect a fluid-tight seal between two machine components which may move one with respect to the other. For example, it may be necessary to effect a seal between a housing having a bore and a shaft which extends through the bore; or to effect a seal between the two components of a ball joint. There have been innumerable proposals for seal devices adapted to effect such seals between two relatively-movable machine components, and it is necessary for a machine designer to select the most appropriate type of seal device, having regard to the operating conditions which may be expected to be encountered.

In the case of machine components which are to be sealed one to the other in the presence of pressurised hot gases, it is known to use a brush seal assembly, on account of the unsatisfactory performance of a simpler seal having for example a synthetic elastomeric annular sealing member clamped to one of the machine components and bearing on the other component. In the case of a brush seal, a plurality of fine bristles (such as of bronze, chrome-nickel alloy or other alloy wires) is held in a carrier mounted on one of the machine components such that the tips of the bristles wipe against the other machine component, so as thereby to effect a seal between the two components.

It is a characteristic of the known designs of brush seal that they must be manufactured to very close tolerances, in order to achieve an effective seal. If the bristles are too short, there will be a gas leakage path between the tips of the bristles and the other machine component against which the seal is to be effected; but on the other hand, if the bristles are too long there will be excessive friction between the bristles and the other machine component, leading to rapid wear of the other machine component. The flexing of the bristles moreover may destroy the effectiveness of the seal, giving a gas leakage path between the bristles.

In addition to the brush seal being manufactured to close tolerances, it is apparent that the machine components also must run true, within fine limits. Whilst this is normally not a problem where for example a shaft is to be sealed to a housing through which the shaft extends, it can be a problem in the case of relatively movable fabricated machine components, which may not be circular. For example, if a seal is to be effected between an adjustable outlet nozzle of a jet engine and the main housing of that jet engine, it may be impractical to manufacture the nozzle and/or the housing to tolerances closer than 1 mm, especially if the nozzle diameter is relatively large. In such a case, one function of a seal device disposed between the components is to take up the manufacturing tolerances, whilst still maintaining a seal between the two components.

It is a principal object of the present invention to provide a brush seal suitable for use between two machine components to effect a seal therebetween, even when the clearance between the two machine components cannot be guaranteed to lie within a closely-controlled tolerance range.

SUMMARY OF THE INVENTION

Accordingly, this invention provides a seal assembly for effecting a seal between two machine components the clearance between which may vary slightly, which assembly comprises a housing attached to or forming a part of one of the machine components and defining a channel facing the surface to be sealed of the other component, a seal member slidably mounted in the channel for movement towards and away from said surface, and spring means disposed in said channel and arranged to urge the seal member towards said surface of the other component, characterised in that the seal member is in the form of a brush seal member comprising a plurality of closely-packed bristles the free tips of which are adapted to bear on and effect a seal against said surface, and in that the spring means allows the brush seal member to accommodate dynamically minor variations in the clearance between the two components by movement of the seal member against the spring bias provided by the spring means.

It will be appreciated that in the seal assembly of this invention, at least small changes in the clearance between the two machine components sealed together by the brush seal member may be accommodated by the brush seal member itself slidably moving within its housing, rather than by the bristles of the brush seal member deflecting and so giving a gas leakage path. Thus, an enhanced sealing effect may be obtained even when the two machine components are not manufactured to very close tolerances. Also, the seal assembly may be used to obtain an effective seal when the gap between the two surfaces to be sealed varies due to thermal, dynamic or other stresses which may cause surface distortions.

A further advantage of the seal assembly of this invention is that non-circular machine components may be sealed one to the other. To facilitate this, it is preferred for the brush seal member either to be flexible along its length or to be formed in several separate pieces arranged end-to-end in a relatively movable manner, whereby a change in the clearance between the two machine components at one location will not significantly affect the sealing effect obtained at a location spaced therefrom. In the case of a multi-piece seal, the bristles of one piece may overlap those of another piece, to maintain the sealing effect in the region of a junction between two pieces.

Preferably, the spring means comprises a so-called wave spring, extending along the length of the channel in which the brush seal member is slidably mounted, the wave spring bearing at a plurality of spaced and alternate points on the brush seal member and a wall of the housing defining the base of the channel. Such a wave spring may be formed from a single blade of a spring steel material, though two or more such blades may be used in parallel if required, to give a greater spring force. An alternative arrangement would be for there to be mounted within the channel a plurality of helical springs each disposed with its axis substantially perpendicular to a tangent to the length of the brush seal member at the point where the spring contacts that member. In such an arrangement, suitable location means may be provided for each helical spring.

For a brush seal assembly of this invention intended for use in an environment where high temperatures are not encountered, it would be possible to use spring means in the form of an elongated strip of elastomeric or other resilient material located in the channel between a wall of the housing defining the base of the channel and the brush seal member itself.

Preferably, the brush seal member has the bristles thereof located between a pair of support plates which bear on the outermost bristles of the brush seal member, one of the support plates extending towards the free tips of the bristles to a greater extent than the other support plate. Said one support plate may thus serve to resist flexing of the bristles in the event that the brush seal member is subjected to a large pressure differential, with the low pressure side of the seal assembly being that on which the said one support plate is located.

In order to give support as close as possible to the free tips of the bristles, said one support plate may have a rubbing surface provided on the edge thereof nearer the free tips of the bristles, which rubbing surface extends substantially to the plane of the free tips of the bristles, and is intended to rub on the sealing surface of said other component. Such a rubbing surface should be adapted to resist galling and pick-up from the sealing surface of the other component; for example, such a rubbing surface may be a cobalt-based alloy applied by a plasma spray system. In this way, the support plate itself may also perform a sealing function.

Though the channel in the housing, and so also the brush seal member, may be endless, for example when a seal is to be effected between two circular or spherical components, the seal assembly of this invention may also be used in circumstances where an endless seal is not practical. For example, the seal assembly may be used to effect a seal between two flat or curved plates which are to move relatively to some limited extent. In such a case, it is preferred for there to be two layers of bristles disposed immediately side by side in the seal member, with the bristles of one layer extending at an acute angle to the surface to be sealed and the bristles of the other layer extending at a similar, but oppositely-directed, acute angle to said surface. In such a case, the relative movement between the machine components should be in a direction substantially normal to the length of the seal member.

The sealing effect obtained by a seal assembly of this invention as described above may be improved by providing two or more brush seal members within a single channel in a housing, each brush seal member being separately spring-urged towards the surface to be sealed of the other machine component. Alternatively, said housing may have two or more channels, each accommodating a brush seal member spring-urged by its own spring means.

Means may be provided to retain the brush seal member in the channel of the housing, should the other component move away from the housing by more then some predetermined extent. To this end, the housing may define a lip projecting transversely across the mouth of the channel, engageable by a part of the brush seal member. To permit changing of the seal member, the housing may be in at least two relatively separable parts.

The preferred form of wave spring allows limited movement of the brush seal member before the spring force exerted on the brush seal member rises significantly. If the seal assembly is configured to effect a seal between a housing and a rotatable shaft, significant excursions of the shaft can be accommodated without the seal member being subjected to high spring forces by providing an endless ring within the channel in the housing which ring encircles the brush seal member and the spring means being disposed between and acting on the ring and the brush seal member. In this way, the brush seal member, spring means and ring may move together within the channel to accommodate shaft excursions, the seal member moving against the force of the spring means to accommodate shaft irregularities.

This invention extends to a seal assembly adapted to effect a seal between two machine components the clearance between which may vary slightly, which seal assembly comprises a housing defining an elongate channel, a seal member slidingly received in said channel for movement into and out of the channel in the direction normal to the length of the channel, and spring means located in the channel to urge the seal member out of the housing, characterised in that the seal member takes the form of an elongate brush seal member and in that minor variations in the clearance between the two components is accommodated dynamically by movement of the brush seal member against the spring bias provided by the spring means.

BRIEF DESCRIPTION OF THE DRAWINGS

By way of example only, certain specific embodiments of seal assembly arranged in accordance with the present invention will now be described in detail, reference being made to the accompanying drawings, in which.

DESCRIPTION OF THE PREFERRED EMBODIMENT

Figure 1:
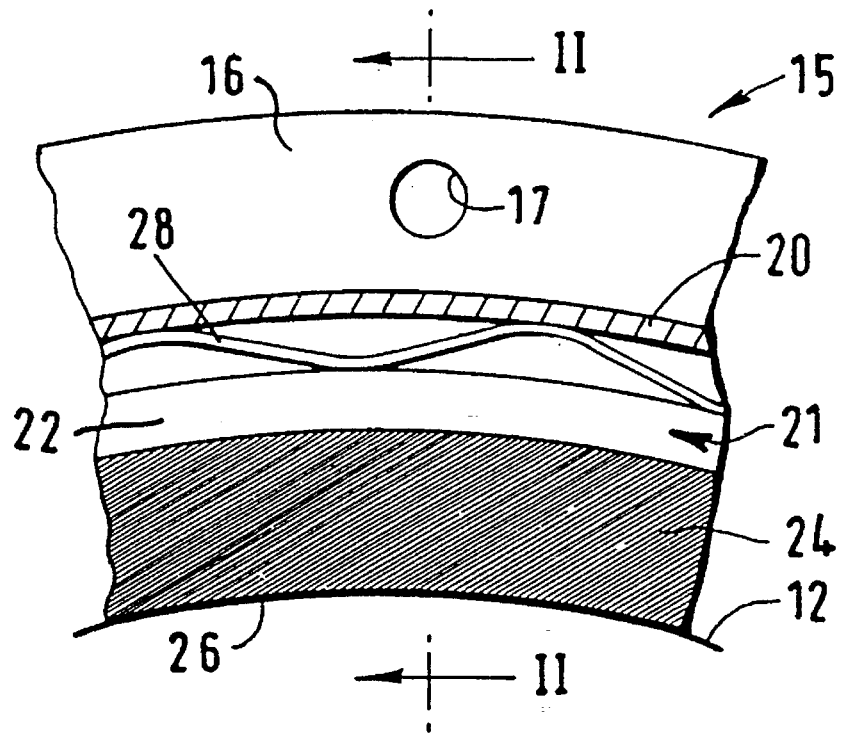
FIG. 1 is a detailed view of a part of an arcuate seal assembly, with part of the housing cut away for clarity.
Figure 2:
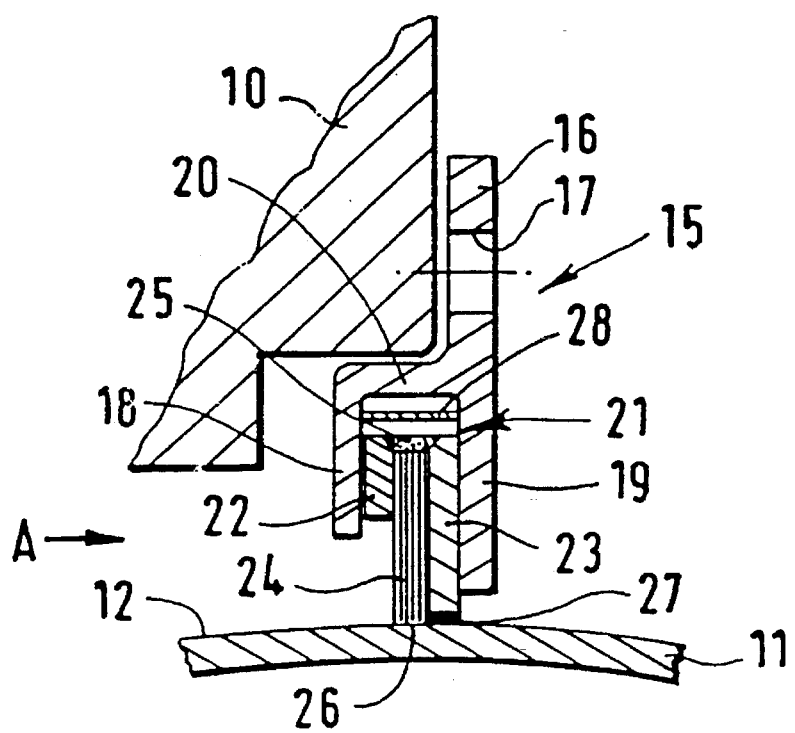
FIG. 2 is a sectional view on the assembly of FIG. 1, taken on line II—II but with the housing complete.

Referring initially to FIGS. 1 and 2, the seal assembly there illustrated is intended to effect a seal between two machine components 10 and 11, component 11 being arranged to move at a relatively slow speed with respect to component 10. The sealing surface 12 of component 11 represents an unmachined surface with an uneven contour, and which could be round, spherical, linear, or of some other form. Such a large unmachined surface may typically have an accuracy deviating from a true profile by perhaps 2.5 mm (0.100") and a brush seal assembly of a conventional design cannot be used to effect an adequate seal thereagainst.

An embodiment of brush seal assembly of this invention which is adapted to effect the required seal comprises a housing 15 having a mounting flange 16 provided with bolt-holes 17, side walls 18 and 19 and base wall 20 of the housing 15 defining an elongate channel in which is located a brush seal member 21. The brush seal member comprises a pair of support plates 22 and 23 between which are clamped a layer of bristles 24, the support plates 22 and 23 and bristles 24 being welded together at 25. As shown in FIG. 1, the bristles 24 are disposed to lie at an acute angle to the plane of the surface 12 against which a seal is to be effected. The support plate 23 extends almost to the free tips 26 of the bristles 24, and the support plate 23 has a rubbing surface 27 provided on the end of that plate adjacent the free tips 26, which rubbing surface extends to and is intended to contact the surface 12.

Also located in the channel defined by the housing 15 is a wave spring member 28, bearing at spaced and alternate locations on the base wall 20 of the housing 15 and on the brush seal member 21, as best seen in FIG. 1. The wave spring member 28 thus urges the brush seal member 21 towards the surface 12 of component 11, against which a seal is to be effected.

The configuration is such that the free tips of the bristles 24 project just beyond the rubbing surface 27. When the seal assembly is in use, the spring 28 urges the seal member 21 towards the surface 12 until the rubbing surface makes contact therewith. In this condition, the bristles are flexed very slightly, in the plane of the bristle layer. Should the spacing between the components 10 and 11 vary within a predefined limit, on relative movement between the components, the brush seal member 21 will move as appropriate against the bias provided by the wave spring member 28, so that the rubbing surface 27 maintains contact with the moving surface 12. If however there is a localised surface variation, where the surface 12 locally moves clear of the rubbing surface 27, the bristles 24 will tend to spring across the resultant gap, by virtue of the flexing of the bristles in their own plane.

The brush seal member 21 may be endless, or could be of some predefined length. Moreover, the seal member could be formed in one piece, or in a plurality of sections linked together.

Figure 3:
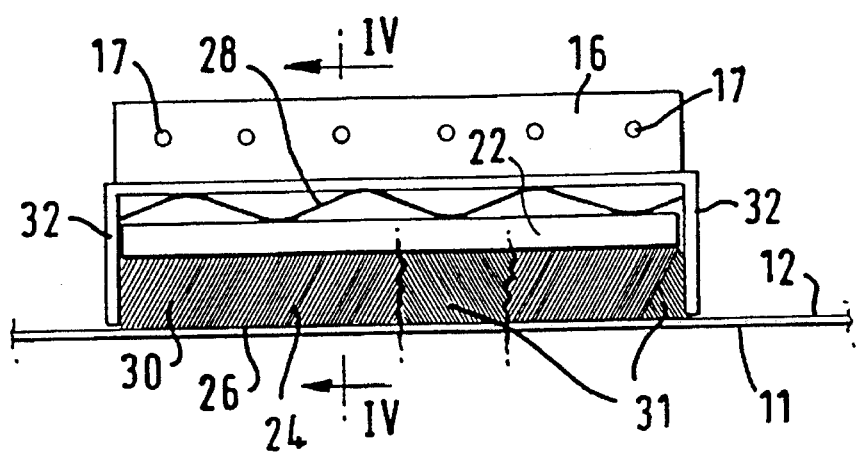
FIG. 3 is a view similar to that of FIG. 1, but on a second embodiment of seal assembly.
Figure 4:
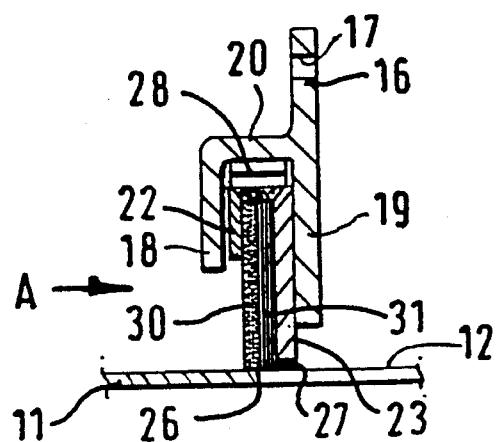
FIG. 4 is a sectional view taken on line IV—IV shown on FIG. 3, but with the housing complete.

Referring now to FIGS. 3 and 4, there is illustrated a second embodiment of seal assembly of this invention, generally similar to that of FIGS. 1 and 2, and like reference characters will be used to indicates like parts: those parts will not be described again here.

The seal assembly of FIGS. 3 and 4 differs from that shown in FIGS. 1 and 2 in that the seal assembly is essentially linear, rather than arcuate. Moreover, in this alternative form of seal assembly, the bristles 24 are provided in two layers 30 and 31, the bristles of one layer lying at a substantially equal but opposite acute angle to the surface to be sealed as compared to the bristles of the other layer. This arrangement allows for the manufacture of a predefined length of brush seal member, whilst still obtaining a sealing effect right to the ends of that member, defined by end plates 32.

When either seal member of this invention as described above is employed, side A of the seal assembly should be subjected to a higher pressure than the opposed side of the seal, so that the bristles 24 will be supported by the relatively long support plate 23 and flexing of the bristles 24 under the pressure difference across the seal will be avoided.

Figure 5:
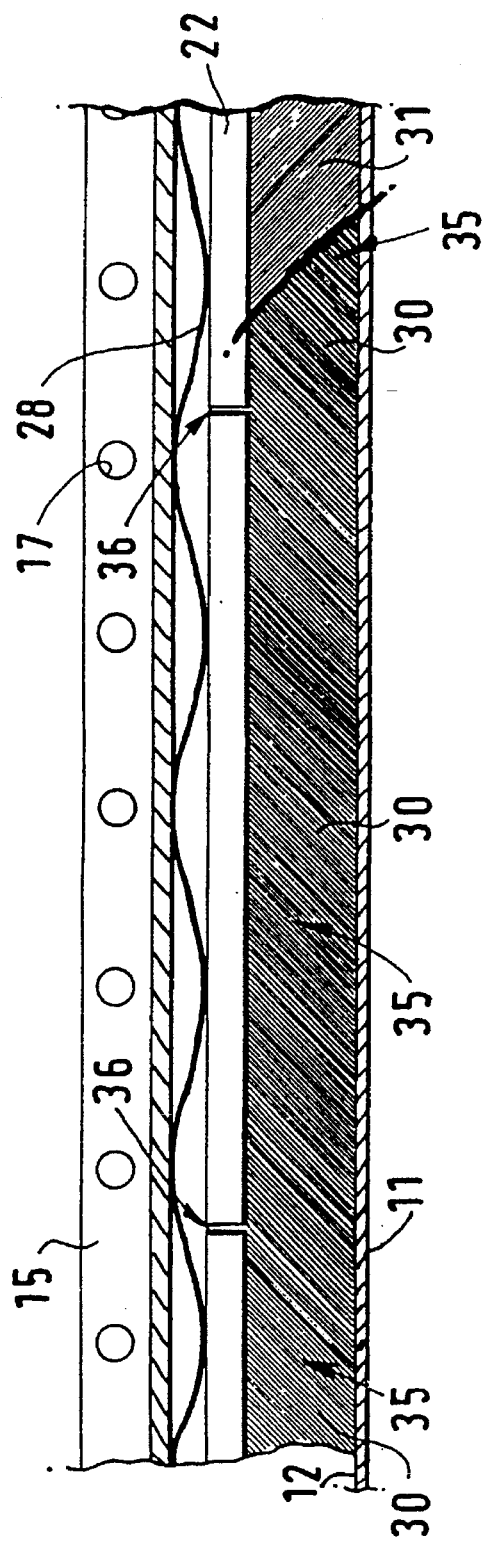
FIG. 5 is a view on a third embodiment of seal assembly, similar to that of FIG. 3.
Figure 6:
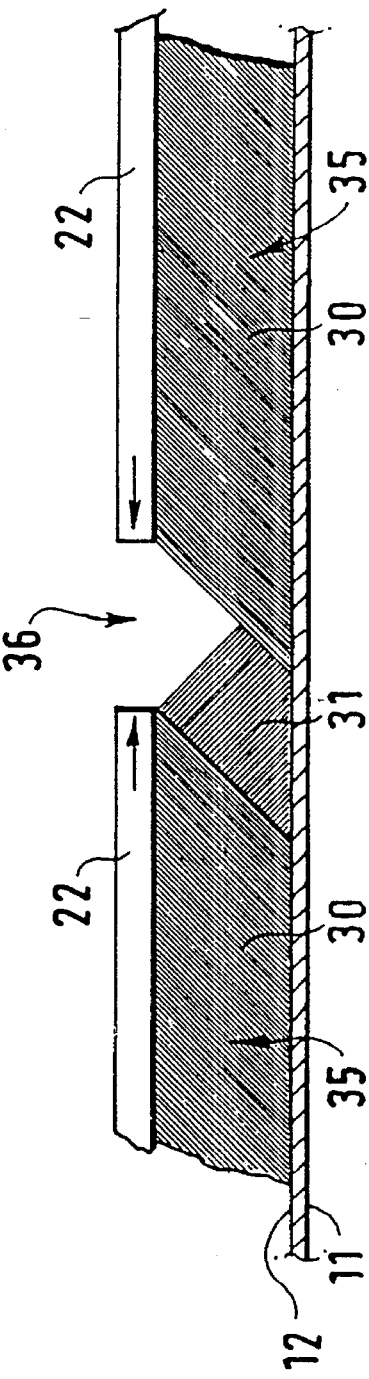
FIG. 6 is an exploded view showing the junction between two seal elements used in the embodiment of FIG. 5.

FIGS. 5 and 6 show how a seal assembly similar to that of FIGS. 3 and 4 may be assembled from a plurality of individual seal elements; like parts with those of FIG. 3 are given like reference characters. In this embodiment, the linear housing 15 has a linear seal member consisting of a plurality of seal elements 35, each having bristles 24 in two layers 30 and 31 of oppositely inclined bristles. FIG. 6 shows the bristle arrangement at a junction 36 between two elements 35, and it can be seen that the overlapping of the bristles is continued at the junction, so giving continuity of the sealing effect. The ends of the seal member (not shown) may be arranged as shown in FIG. 3.

A particular advantage of the arrangement illustrated in FIGS. 5 and 6 is that small movements are possible between the seal elements 35, so permitting an enhanced sealing effect where a long seal is required and the gap between the surfaces to be sealed is not constant.

In an alternative but similar arrangement, each seal element may be as illustrated in FIG. 3; relative movements between the elements would still be possible, though the sealing effect at the junctions between elements may not be quite so good.

Figure 7:
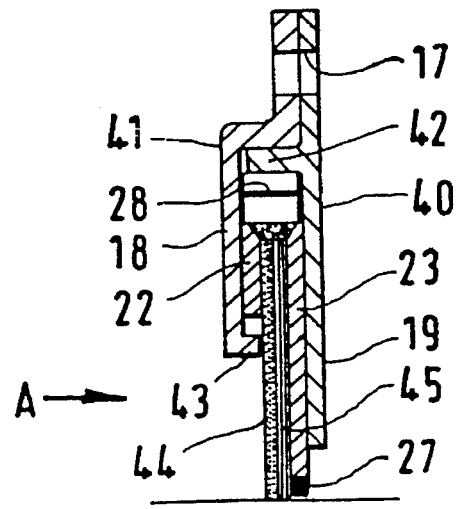
FIG. 7 is a view similar to that of FIG. 2, but of yet another embodiment of seal assembly of this invention.

In the seal assembly of FIG. 1, the seal member may drop out of the channel in the housing 15 in the event that the component 11 moves away from the housing by too great an extent. The seal assembly of FIG. 7 has a modified housing to overcome this; here the housing is in two parts 40 and 41 held together by the mounting bolts (not shown) which pass through the holes 17. Housing part 40 defines side wall 19 and a flange 42 extending at right angles thereto; and housing part 41 defines side wall 18 and bears on the flange 42. The side wall 18 has an in-turned lip 43 at its free end, against which the plate 22 of the seal member 21 will bear if the component 11 moves away from the housing 15.

The seal member is then shown as having two rows of bristles 44 and 45, but in other respects the arrangement corresponds to that illustrated in FIGS. 1 and 2; it will not be described further here.

Figure 8:
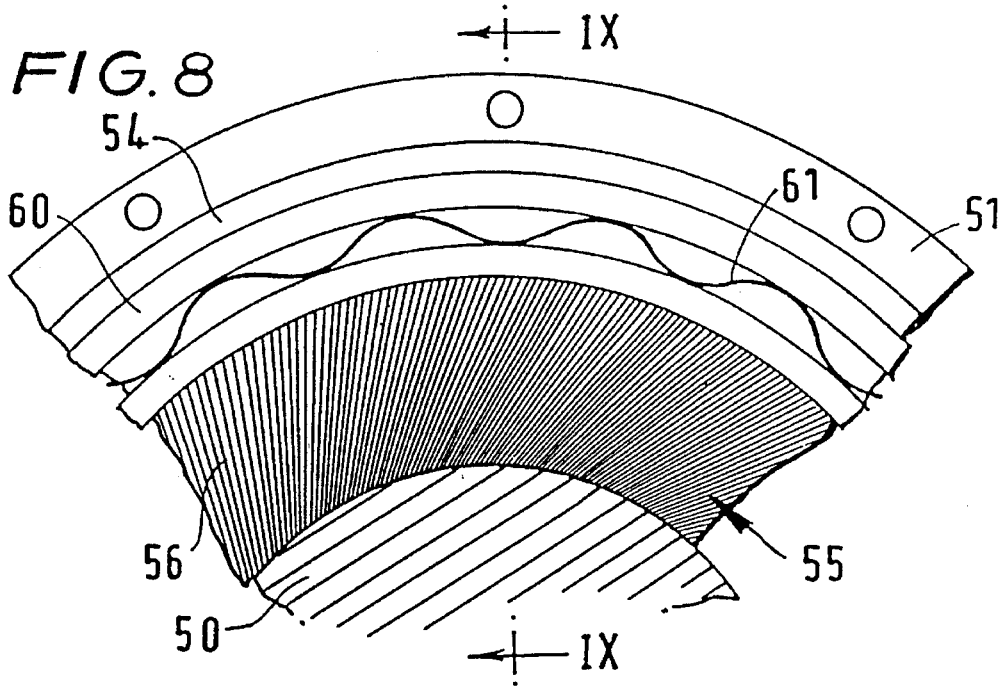
FIGS. 8 and 9 are views similar to those of FIGS. 1 and 2, but on a further embodiment of seal assembly of this invention.
Figure 9:
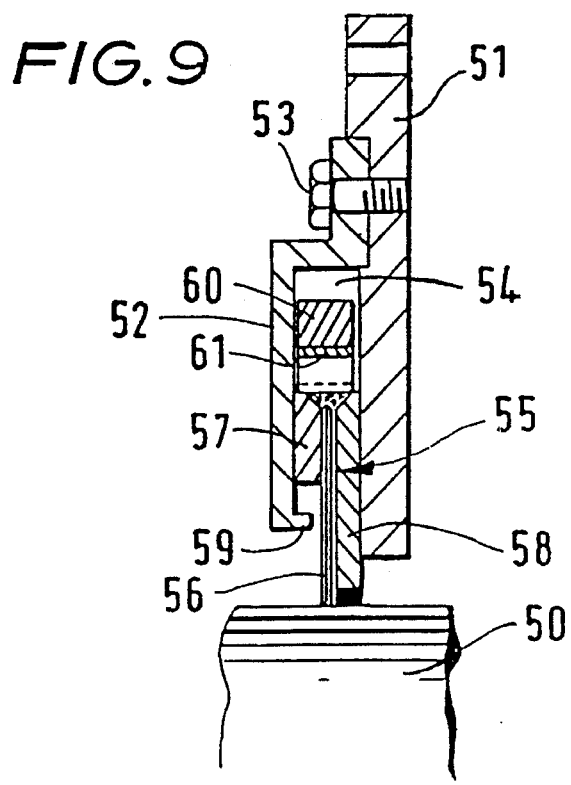

FIGS. 8 and 9 show yet another arrangement of seal assembly, generally similar to that of FIGS. 1 and 2, but intended for use on a circular shaft 50. In this assembly, a housing is constructed from housing parts 51 and 52, held together by bolt 53 to define a channel 54 in which is slidably mounted a multi-element brush seal member 55, having one row of bristles 56. Each element is welded from a pair of support plates 57 and 58 with the bristles 56 therebetween. Housing part 52 has an in-turned lip 59 to retain the seal member in the housing, as described above with reference to FIG. 7.

Also located in the housing 51 is a continuous ring 60 surrounding the brush seal member 55, with a wave-spring 61 positioned between the ring 60 and seal member 55. The whole of the seal member together with the ring 60 and spring 61 may float in the housing, for example to accommodate excursions of the shaft 50 with respect to the housing, whilst the multi-element seal member urged by spring 61 may accommodate any non-circularity or other variations in the shaft.

Figure 10:
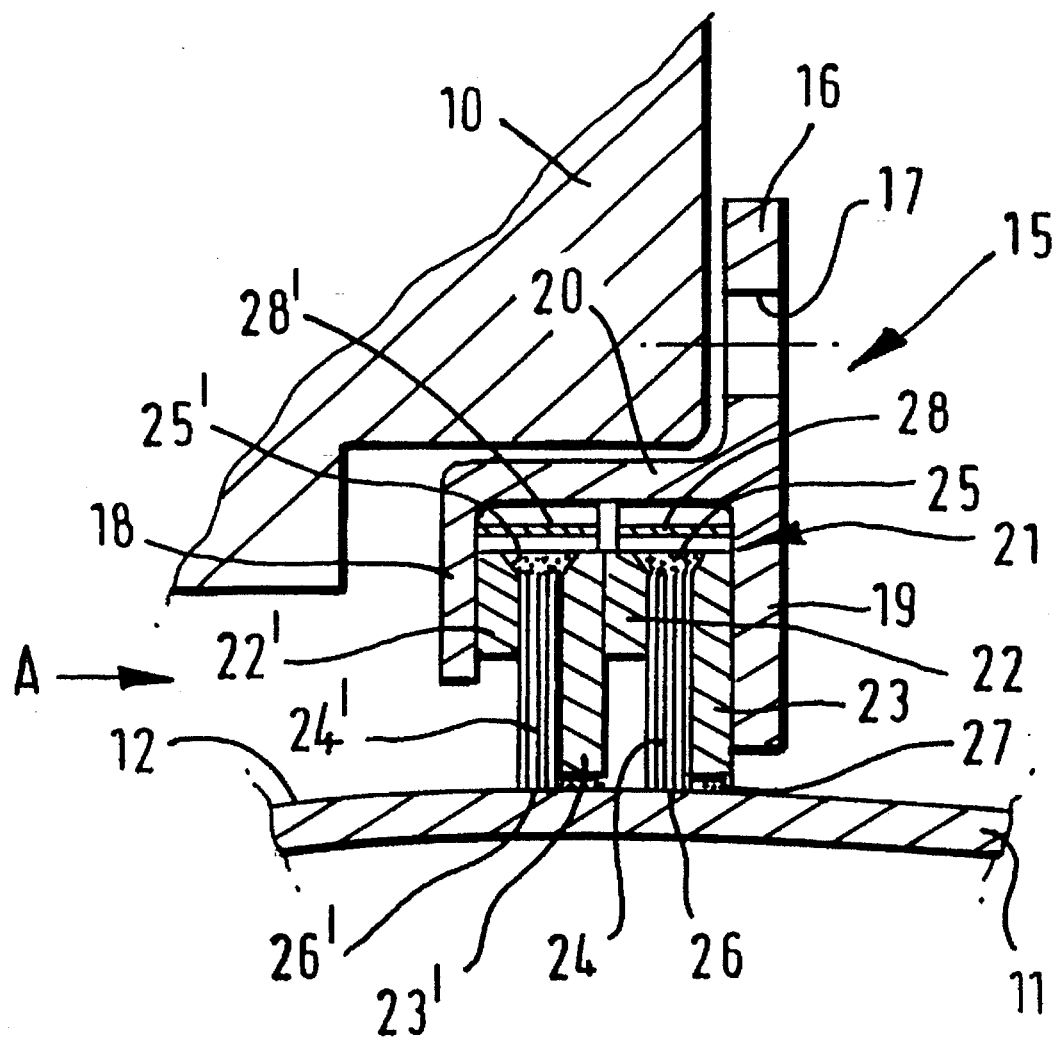
FIG. 10 is a sectional view similar to FIG. 2 of still another embodiment of the seal assembly of this invention.

FIG. 10 shows still another arrangement of the seal assembly, generally similar to that of FIG. 2, but illustrating two brush seal members provided within a single channel in housing 15. One brush seal member comprises a layer of bristles 24 clamped between a pair of support plates 22 and 23 welded together at 25, while the second brush seal member includes a layer of bristles 24' clamped between a pair of support plates 22' and 23' welded together at 25'. Each brush seal member is separately spring urged by a wave spring member 28, 28', respectively, towards the surface 12 to be sealed so that the free tips 26, 26' of the bristles 24, 24' respectively effect the desired seal. In all other respects, the structure and components illustrated in FIG. 10 is identical to that previously described herein with respect to FIG. 2.

I claim:

1. A seal assembly for effecting a seal between two machine components the clearance between which may vary slightly, which assembly comprises a housing attached to or forming a part of one of the machine components and defining a channel facing the surface to be sealed of the other component, a seal member slidably mounted in the channel for movement towards and away from said surface, and spring means disposed in said channel and arranged to urge the brush seal member towards said surface of the other component, characterized in that the seal member is in the form of a brush seal member comprising a plurality of closely-packed bristles the free tips of which are adapted to bear on and effect a seal against said surface, in that the spring means allows the brush seal member to accommodate dynamically minor variations in the clearance between the two components by movement of the seal member against the spring bias provided by the spring means, and in that the housing is in two relatively separate parts which when fitted together define the channel, and a wall of the housing defining said channel has an in-turned lip which projects transversely across the mouth of the channel.

2. A seal assembly as claimed in claim 1, wherein the brush seal member is formed in several pieces arranged end-to-end in a relatively movable manner.

3. A seal assembly as claimed in claim 2, wherein the spring means comprises a wave spring extending along the length of the channel in which the brush seal member is slidably mounted, the wave spring bearing at a plurality of spaced and alternate points on the brush seal members and on a wall of the housing defining the base of the channel.

4. A seal assembly as claimed in claim 1, wherein the spring means comprises a wave spring extending along the length of the channel in which the brush seal member is slidably mounted, the wave spring bearing at a plurality of spaced and alternate points on the brush seal members and on a wall of the housing defining the base of the channel.

5. A seal assembly as claimed in claim 1, wherein the bristles of the brush seal member are located between a pair of support plates which bear on the outermost bristles of the brush seal member, one of the support plates extending towards the free tips of the bristles to a greater extent than the other support plate.

6. A seal assembly according to claim 5, wherein said one support plate is provided with a rubbing surface on the edge thereof nearer the free tips of the bristles, which rubbing surface extends substantially to the plane of the free tips of the bristles.

7. A seal assembly as claimed in claim 1, wherein two or more brush seal members are provided within a single channel in the housing, each brush seal member being separately spring-urged towards the surface to be sealed of the other machine components.

8. A seal assembly for effecting a seal between two machine components the clearance between which may vary slightly, which assembly comprises a housing attached to or forming a part of one of the machine components and defining a channel facing the surface to be sealed of the other component, a seal member slidably mounted in the channel for movement towards and away from said surface, and spring means disposed in said channel and arranged to urge the brush seal member towards said surface of the other component, characterized in that the seal member is in the form of a brush seal member comprising a plurality of closely-packed bristles the free tips of which are adapted to bear on and effect a seal against said surface, in that the spring means allows the brush seal member to accommodate dynamically minor variations in the clearance between the two components by movement of the seal member against the spring bias provided by the spring means, and in that the housing defines an annular channel, the brush seal member is annular and there is provided an endless ring within the channel which ring encircles the brush seal member, the spring means being disposed between and acting on said ring and the brush seal member.

9. A seal assembly for effecting a seal between two machine components the clearance between which may vary slightly, which assembly comprises a housing attached to or forming a part of one of the machine components and defining a channel facing the surface to be sealed of the other component, a seal member slidably mounted in the channel for movement towards and away from said surface, and spring means disposed in said channel and arranged to urge said seal member toward said surface of the other component, characterized in that said seal member is formed in several pieces arranged end-to-end in a relatively movable manner, each said piece being in the form of a brush seal member comprising a plurality of closely-packed bristles the free tips of which are adapted to bear on and effect a seal against said surface, the bristles of one piece overlapping the bristles of the next adjacent piece in the region of a Junction between the two pieces, and further characterized in that the spring means allows said pieces of the brush seal member to accommodate dynamically minor variations in the clearance between the two components by movement of the seal member against the spring bias provided by the spring means.

10. A seal assembly as claimed in claim 9, wherein the spring means comprises a wave spring extending along the length of the channel in which the brush seal member is slidably mounted, the wave spring bearing at a plurality of spaced and alternate points on the pieces of the seal member and on a wall of the housing defining the base of the channel.

11. A seal assembly as claimed in claim 9, wherein the bristles of each piece of the seal member are located between a pair of support plates which bear on the outermost bristles of the seal member, one of the support plates extending towards the free tips of the bristles to a greater extent than the other support plate.

12. A seal assembly according to claim 11, wherein said one support plate is provided with a rubbing surface on the edge thereof nearer the free tips of the bristles, which rubbing surface extends substantially to the plane of the free tips of the bristles.

13. A seal assembly as claimed in claim 9, wherein each piece of the seal member has two layers of bristles disposed immediately side-by-side, the bristles of one layer extending at an acute angle to the surface to be sealed and the bristles of the other layer extending at a similar, but oppositely-directed, acute angle to said surface.

14. A seal assembly for effecting a seal between two machine components the clearance between which may vary slightly, which assembly comprises a housing attached to or forming a part of one of the machine components and defining a channel facing the surface to be sealed of the other component, a seal member slidably mounted in the channel for movement towards and away from said surface, and spring means disposed in said channel and arranged to urge said seal member towards said surface of the other component, characterized in that the seal member is in the form of a brush seal member comprising a plurality of closely-packed bristles arranged in two layers disposed immediately side-by-side, the free tips of which bristles are adapted to bear on and effect a seal against said surface, and the bristles of one layer extending at an acute angle to the surface to be sealed and the bristles of the other layer extending at a similar, but oppositely-directed, acute angle to said surface, and further characterized in that the spring means allows the brush seal member to accommodate dynamically minor variations in the clearance between the two components by movement of the seal member against the spring bias provided by the spring means.

15. A seal assembly as claimed in claim 14, wherein the brush seal member is formed in several pieces arranged end-to-end in a relatively movable manner.

16. A seal assembly as claimed in claim 15, wherein the bristles of one piece overlap the bristles of the next adjacent piece in the region of a junction between the two pieces.

17. A seal assembly as claimed in claim 16, wherein the spring means comprises a wave spring extending along the length of the channel in which the brush seal member is slidably mounted, the wave spring bearing at a plurality of spaced and alternate points on the brush seal members and on a wall of the housing defining the base of the channel.

18. A seal assembly as claimed in claim 14, wherein the bristles of the brush seal member are located between a pair of support plates which bear on the outermost bristles of the brush seal member, one of the support plates extending towards the free tips of the bristles to a greater extent than the other support plate.

19. A seal assembly according to claim 18, wherein said one support plate is provided with a rubbing surface on the edge thereof nearer the free tips of the bristles, which rubbing surface extends substantially to the plane of the free tips of the bristles.

20. A seal assembly for effecting a seal between two machine components the clearance between which may vary slightly, which assembly comprises a housing attached to or forming a part of one of the machine components and defining a channel facing the surface to be sealed of the other component, a seal member slidable mounted in the channel for movement towards and away from said surface, the seal member being in the form of a brush seal member comprising a plurality of closely-packed bristles the free tips of which are adapted to bear on and effect a seal against said surface, retention means to retain the brush seal member in the channel of the housing, and spring means disposed in said channel and arranged to urge said seal member towards said surface of the other component, the spring means allowing the brush seal member to accommodate dynamically minor variations in the clearance between the two components by movement of the seal member against the spring bias provided by the spring means.

21. A seal assembly as claimed in claim 20, wherein the brush seal member is formed in several pieces arranged end-to-end in a relatively movable manner.

22. A seal assembly as claimed in claim 21, wherein the bristles of one piece overlap the bristles of the next adjacent piece in the region of a junction between the two pieces.

23. A seal assembly as claimed in claim 22, wherein the spring means comprises a wave spring extending along the length of the channel in which the brush seal member is slidably mounted, the wave spring bearing at a plurality of spaced and alternate points on the brush seal members and on a wall of the housing defining the base of the channel.

24. A seal assembly as claimed in claim 20, wherein the spring means comprises a wave spring extending along the length of the channel in which the brush seal member is slidably mounted, the wave spring bearing at a plurality of spaced and alternate points on the brush seal members and on a wall of the housing defining the base of the channel.

25. A seal assembly as claimed In claim 20, wherein the bristles of the brush seal member are located between a pair of support plates which bear on the outermost bristles of the brush seal member, one of the support plates extending towards the free tips of the bristles to a greater extent than the other support plate.

26. A seal assembly according to claim 25, wherein said one support plate is provided with a rubbing surface on the edge thereof nearer the free tips of the bristles, which rubbing surface extends substantially to the plane of the free tips of the bristles.

27. A seal assembly according to claim 20, wherein the housing is in two relatively separate parts which when fitted together define the channel, and a wall of the housing defining said channel having an in-turned lip which projects transversely across the mouth of the channel.

28. A seal assembly as claimed in claim 20, wherein the housing defines an annular channel, the brush seal member is annular and there is provided an endless ring within the channel which ring encircles the brush seal member, the spring means being disposed between and acting on said ring and the brush seal member.

* * * * *